United States Patent
Min et al.

(10) Patent No.: US 9,448,342 B2
(45) Date of Patent: Sep. 20, 2016

(54) OPTICAL SOURCES AND DISPLAY DEVICES

(71) Applicant: LMS CO., LTD., Pyeongtaek (KR)

(72) Inventors: Jee Hong Min, Seongnam (KR); Sung Sik Cho, Suwon (KR); Oh Hyun Kwon, Osan (KR); Tae Jun Lee, Osan (KR); Woo Jong Lee, Osan (KR)

(73) Assignee: LMS CO., LTD., Pyeongtaek (KR)

( * ) Notice: Subject to any disclaimer, the term of this patent is extended or adjusted under 35 U.S.C. 154(b) by 0 days.

(21) Appl. No.: 14/391,391

(22) PCT Filed: Apr. 4, 2013

(86) PCT No.: PCT/KR2013/002792
§ 371 (c)(1),
(2) Date: Oct. 9, 2014

(87) PCT Pub. No.: WO2013/154299
PCT Pub. Date: Oct. 17, 2013

(65) Prior Publication Data
US 2015/0070903 A1    Mar. 12, 2015

(30) Foreign Application Priority Data
Jul. 9, 2012 (KR) .................. 10-2012-0036836

(51) Int. Cl.
| | |
|---|---|
| *F21V 3/00* | (2015.01) |
| *G02B 5/04* | (2006.01) |
| *G02B 5/02* | (2006.01) |
| *F21V 8/00* | (2006.01) |
| *G02F 1/1335* | (2006.01) |
| *G02B 1/04* | (2006.01) |

(52) U.S. Cl.
CPC .............. *G02B 5/045* (2013.01); *G02B 5/0268* (2013.01); *G02B 5/0278* (2013.01); *G02B 6/0053* (2013.01); *G02B 1/04* (2013.01); *G02F 2001/133607* (2013.01); *G02F 2201/503* (2013.01); *G02F 2202/28* (2013.01)

(58) Field of Classification Search
CPC .................. G02F 1/133606; G02B 5/045
See application file for complete search history.

(56) References Cited

U.S. PATENT DOCUMENTS

2003/0223216 A1   12/2003   Emmons et al.
2005/0148676 A1    7/2005   Doi et al.
(Continued)

FOREIGN PATENT DOCUMENTS

KR   10-2004-0099333 A   11/2004
KR   10-2005-0099288 A   10/2005
(Continued)

*Primary Examiner* — Sean Gramling
(74) *Attorney, Agent, or Firm* — Patent Office of Dr. Chung Park (57) ABSTRACT

Provided are an optical member having adhesion and elastic restoring force, and a light source device and a display device including the same, the optical member including: a base film; an optical pattern layer provided on the base film and having adhesion; and an upper film partially adhering onto the optical pattern layer, in which at least a partial region of the optical pattern layer has a characteristic in which the partial region is deformed when external force is applied and restored when the external force is removed, and it is easy to assemble a product to improve productivity, and the elastic restoring force is excellent to suppress damage due to the external force.

14 Claims, 6 Drawing Sheets

(a)

(b)

(56) References Cited

U.S. PATENT DOCUMENTS

| | | |
|---|---|---|
| 2006/0083478 A1 | 4/2006 | Emmons et al. |
| 2006/0285816 A1 | 12/2006 | Pokorny et al. |
| 2010/0039808 A1* | 2/2010 | Purchase ............... G02B 3/005 362/235 |
| 2010/0103529 A1* | 4/2010 | Nakamura ............... G02B 1/04 359/620 |
| 2010/0165638 A1* | 7/2010 | Kim et al. ................... 362/317 |
| 2011/0164205 A1* | 7/2011 | Kashiwagi ........... G02B 5/0231 349/96 |

FOREIGN PATENT DOCUMENTS

| | | |
|---|---|---|
| KR | 10-2005-0004238 A | 12/2005 |
| KR | 10-2008-0103413 A | 11/2008 |
| KR | 10-2010-0107891 A | 6/2010 |
| KR | 10-0964642 B | 6/2010 |

* cited by examiner

OPTICAL SOURCES AND DISPLAY DEVICES

CROSS-REFERENCE TO PRIOR APPLICATIONS

This application is a national Stage Patent Application of PCT International Patent Application No. PCT/KR2013/002792, filed on Apr. 4, 2013 under 35 U.S.C. §371, which claims priority of Korean Patent Application No. 10-2012-0036836, filed on Apr. 9, 2012, which are all hereby incorporated by reference in their entirety.

TECHNICAL FIELD

The present invention relates to an optical member, and a light source device and a display device including the same, and more particularly, to an optical member having adhesion and elastic restoring force, and a light source device and a display device including the same.

BACKGROUND ART

Figure 1:
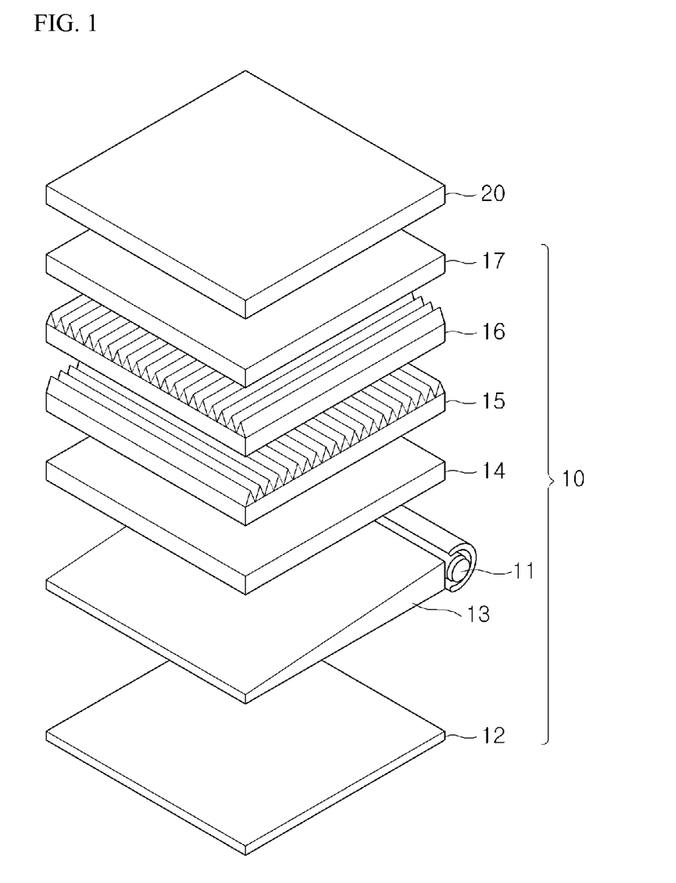
FIG. 1 is an exploded perspective view of a general liquid crystal display.

A liquid crystal display (LCD) is an indirect emission type display device which does not self-emit light and displays an image by controlling transmittance of light incident from an external light source. The LCD includes a separate light source, that is, a backlight unit (BLU) at one side of a liquid crystal panel and displays the image by controlling transmittance of light emitted from the BLU. The backlight unit generally includes a light source such as a fluorescent lamp and a light emitting device (LED), a light guide plate, and optical sheets such as a diffusion sheet and a prism sheet. FIG. 1 is an exploded perspective view of a general liquid crystal display.

Referring to FIG. 1, the liquid crystal display includes a backlight unit 10 and a liquid crystal panel 20. Generally, the backlight unit 10 is provided at the rear side of the liquid crystal panel 20 so as to irradiate the light to the liquid crystal panel 20, and includes a light source 11, a reflection plate 12, a light guide plate 13, a diffusion sheet 14, prism sheets 15 and 16, and a protective sheet 17.

The light guide plate 13 shifts a progressing direction so as to irradiate the light emitted from the light source 11 to the liquid crystal panel 20 side, and the reflection plate 12 is disposed at the rear side of the light guide plate 13 and reflects the light emitted to the rear side of the light guide plate 13 to the light guide plate 13 to minimize the loss of light. The diffusion sheet 14 serves to uniformly disperse the light incident from the light guide plate 13, the prism sheets 15 and 16 concentrate the light incident through an optical pattern formed on the surface thereof to emit the concentrated light to the liquid crystal panel 20, and the protective sheet 17 is provided on the prism sheets 15 and 16 to serve to protect the prism sheets 15 and 16.

The prism sheet is formed on a light transmitting base film with an optical pattern layer on which a triangular array-shaped optical pattern having a slope of 45° is generally formed in order to improve front-directional luminance. Such an optical pattern is formed in a mountain shape, and thus the upper portion of the mountain is easily broken or distorted to be damaged due to external small scratches. Accordingly, when the optical pattern is damaged, due to a difference in a path of the emitted light between a damaged portion and a normal portion, the luminance deteriorates and defects of the image in the liquid crystal display occur. Therefore, when the prism sheet is produced, there is a case where the entire surface of the produced prism sheet is not used according to a position even by the minute defect. This causes reduced productivity and presently, affects the rise in costs.

Recently, with activation of the use of personal portable terminals such as a smart phone which operates by directly touching the liquid crystal display, the terminals have been small-sized and reduced in weight so as to be easily carried, and as a result, the thickness of the liquid crystal panel tends to be gradually decreased. As a result, when unnecessary pressure is applied through the liquid crystal panel, cases where the optical pattern of the prism sheet is damaged will frequently occur. Particularly, in the case of using a plurality of prism sheets for improving the luminance, an optical pattern layer of the prism sheet disposed at the lower side as well as an optical pattern layer of the prism sheet disposed at the upper side are pressed and deformed, and thus there is a problem in that distortion in the image displayed on the liquid crystal panel occurs. Accordingly, development of an optical sheet including an optical structure surface which can flexibly cope with force applied from the outside is much needed.

SUMMARY OF THE INVENTION

The present invention has been made in an effort to provide an optical member having adhesion, and a light source device and a display device including the same.

The present invention has also been made in an effort to provide an optical member having elastic restoring force, and a light source device and a display device including the same.

The present invention has also been made in an effort to provide an optical member which may improve reliability and durability of products, and a light source device and a display device including the same.

An exemplary embodiment of the present invention provides an optical member including: a base film, an optical pattern layer provided on the base film and having adhesion; and an upper film partially adhering onto the optical pattern layer, wherein at least a partial region of the optical pattern layer has a characteristic in which the partial region is deformed when external force is applied and restored when the external force is removed.

The optical pattern layer may be formed by mixing a main material providing adhesion and an elastic material providing elasticity. The main material may include at least one of an acrylated monomer, a diacrylated monomer, a urethane acrylate oligomer, a polyester acrylate oligomer, an epoxy acrylated oligomer, and a high refractive acrylated monomer. The elastic material may include at least one (meth) acrylate compound selected from a compound group represented by the following Chemical Formulas 1 to 3.

[Chemical Formula 1]

-continued

[Chemical Formula 2]

[Chemical Formula 3]

In Chemical Formulas 1 to 3, X may be any one of S, C(CH3)2, PO2, and SO2, Y may be H or CH3, and Z may be H or CH3. In addition, n+m may have values of 5 to 30.

The elastic material of 10% to 50% may be included with respect to a total weight of the main material and the elastic material.

The optical pattern layer may include optical patterns having the same height of steps.

The optical pattern layer may include optical patterns having a multiple structure with different steps.

The optical pattern layer may be restored within 60 seconds when the optical pattern layer is pressurized at a weight of 10 kgf to 30 kgf for 10 to 60 seconds.

When the external force is removed, the optical pattern layer may be restored 95% or more before the external force is applied.

A light source device may be configured by using the optical member having the aforementioned features, and a display device may be configured by using the configured light source device.

According to the exemplary embodiment of the present invention, the optical members can easily adhere to other optical members due to excellent adhesion. As a result, the assembling of the product is easy to improve productivity.

According to the exemplary embodiment of the present invention, the elastic restoring force is excellent to suppress the damage due to the external force. Even through the optical member is deformed by the external force during the assembling of the product, the optical member can be easily restored and the productivity may be suppressed from being decreased, and the deterioration of the luminance due to the damage on the optical pattern may be suppressed.

Particularly, the deformation and the damage due to the frequent use of the product may be suppressed, thereby improving durability of the product.

DETAILED DESCRIPTION

Hereinafter, an exemplary embodiment of the present invention will be described in detail with reference to the accompanying drawings. As those skilled in the art would realize, the described embodiments may be deformed in various different ways, all without departing from the spirit or scope of the present invention. On the contrary, exemplary embodiments introduced herein are provided to make disclosed contents thorough and complete and sufficiently transfer the spirit of the present invention to those skilled in the art.

Hereinafter, preferable exemplary embodiments of the present invention will be described with reference to the accompanying drawings.

Figure 2:
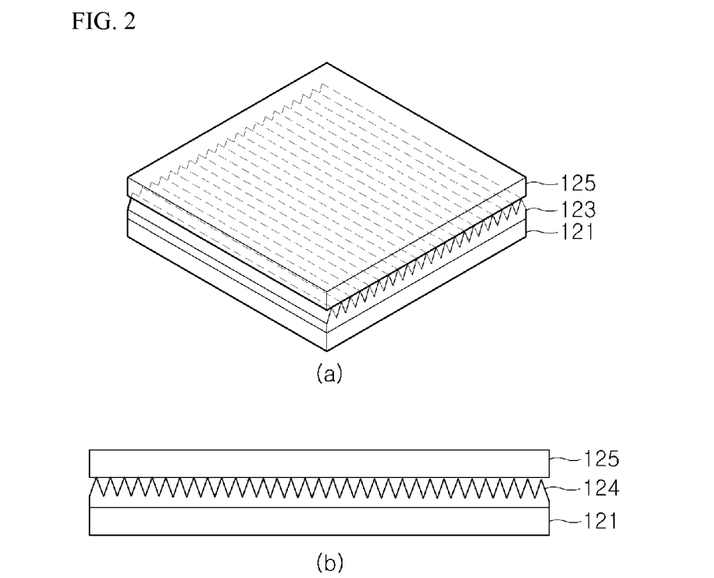
FIG. 2 is a perspective view and a cross-sectional view of a prism sheet according to an exemplary embodiment of the present invention.
Figure 3:
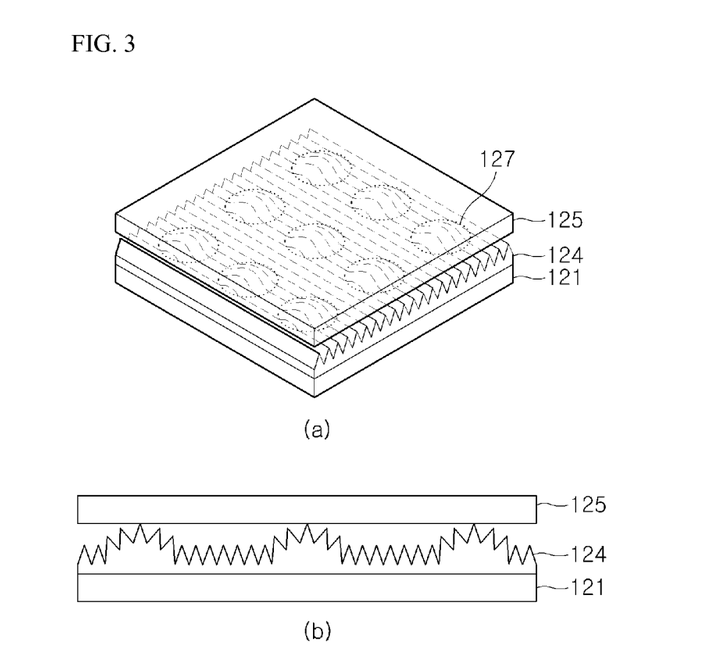
FIG. 3 is a perspective view and a cross-sectional view illustrating a modified example of the prism sheet.

FIG. 2 is a perspective view and a cross-sectional view of a prism sheet according to an exemplary embodiment of the present invention, and FIG. 3 is a perspective view and a cross-sectional view illustrating a modified example of the prism sheet.

Referring to FIG. 2, the prism sheet includes a base film 121, an optical pattern layer 123 formed on the base film 121, and an upper film 125 adhering to the optical pattern layer 123.

The base film 121 and the upper film 125 may use at least one of polycarbonate (PC), polyethylene terephthalate (PET), polypropylene (PP), polyethylene (PE), and polymethyl methacrylate (PMMA). The materials are materials transmitting light incident from the rear side and have relatively high refractive indexes.

The optical pattern layer 123 includes an optical pattern for concentrating the light incident from the rear side to emit the concentrated light to the front side, that is, the liquid crystal panel side. The optical pattern has a predetermined cross-section and may be formed to be continuously arranged in any one direction of the base film 121. For example, the optical pattern may be formed in a triangular cross-sectional shape having a predetermined size as illustrated in FIG. 2, and may be formed by a double structure in which a triangular cross-sectional shape having a predetermined size and a projecting structure 127 having a step higher than the triangular cross-sectional shape are partially formed as illustrated in FIG. 3. FIG. 3 illustrates that the projecting structure 127 is formed in a substantially convex-lens shape, but the shape is not limited thereto and may have a multiple structure. When the optical pattern layer 124 is formed in the double structure as illustrated in FIG. 3, the projecting structure 127 having the high step adheres to the upper film 125 to reduce an adhering area as compared with the optical pattern layer 123 having the shape illustrated in FIG. 2. When the upper film 125 adheres to the optical pattern layers 123 and 124, since the shapes of the optical patterns formed on the optical pattern layers 123 and 124 are deformed to some extent, a light characteristic at the adhering portion is changed, and thus a phenomenon in which the luminance is decreased occurs. Accordingly, in order to minimize the phenomenon, the adhering area between the optical pattern layers 123 and 124 and the upper film 125 needs to be reduced.

The optical pattern layer 123 according to the exemplary embodiment of the present invention may have adhesion and elasticity. Here, the elasticity is a property in which an object deformed by external force returns to an original shape when the force is removed, and the optical pattern layer 123 has a property in which the optical pattern layer 123 is not broken but deformed by the external force and then returns to an original shape when the external force is removed. The upper film 125 is disposed on such an optical pattern layer 123, and another optical pattern layer with an optical pattern for concentrating the light may be formed even on the entire surface of the upper film 125. In this case, in each optical pattern layer, arrangement directions of the optical patterns need to have predetermined angles and be disposed to cross each other. Such a crossing angle may vary according to a shape of the optical pattern, and for example, as illustrated in FIG. 2, when the optical patterns have the triangular cross-sectional shape and are continuously arranged in one direction, the upper film may be disposed so that the optical patterns are orthogonal to each other.

In order to always uniformly maintain the disposed state of the upper film 125, during a process of assembling the backlight unit, there is a method of laminating and then fixing different kinds of sheets, but in the exemplary embodiment of the present invention, the upper film 125 adheres onto the optical pattern layer 123 by using the adhesion of the optical pattern layer 123 to be integrally formed with the base film 121 and the optical pattern layer 123. However, in the process where the upper film 125 adheres onto the optical pattern layer 123, since the predetermined pressure needs to be applied, the optical patterns formed on the optical pattern layer 123 may be frequently damaged or deformed. However, since the optical pattern layer 123 according to the exemplary embodiment of the present invention has elasticity, the optical pattern layer 123 is deformed when the pressure is applied from the outside and then restored to the original state again when a predetermined time has elapsed.

Such an optical pattern layer 123 is formed by using a mixture of a main material for providing adhesion and an elastic material for providing elasticity. The main material of the optical pattern layer 123 includes at least one of an acrylated monomer, a diacrylated monomer, a urethane acrylate oligomer, a polyester acrylate oligomer, an epoxy acrylated oligomer, and a high refractive acrylated monomer. In addition, the main material of the optical pattern layer 123 may further include a photo initiator initiating reaction of a monomer or an oligomer when light such as ultra violet (UV) is irradiated and an adhesion promoter for increasing adhesion. Here, the main material has adhesion for easy adhesion with other materials itself as a photo-curable material, and maintains a pressed state, that is, the adhering state when the light such as UV is irradiated while being pressed with other materials. In this case, when the main material is cured once, the main material has slight elasticity.

In addition, the elastic material for providing elasticity to the optical pattern layer 123 includes at least one of (meth) acrylates having a high refractive index of 1.55 or more represented by the following Chemical Formulas 1 to 3.

[Chemical Formula 1]

[Chemical Formula 2]

[Chemical Formula 3]

In Chemical Formulas 1 to 3, X may be any one of S, C(CH3)2, PO2, and SO2, Y may be H or CH3, and Z may be H or CH3. In addition, n+m may have values of 5 to 30.

The content of the elastic material of Chemical Formulas 1 to 3 may be 10% to 50% with respect to a total weight of the main material and the elastic material which are used to form the optical pattern layer 123. When the content of the elastic material is much more than the given range, the elasticity is increased and restoring force is improved, but the hardness of the optical pattern layer 123 is decreased, and thus it is easy to be deformed even by relatively weak force, and as a result, there are problems in that deterioration of the luminance and distortion of the image occur. Meanwhile, when the content of the elastic material is much less than the given range, brittleness is increased, and thus there are problems in that the optical pattern layer 123 is easily damaged by external force and it is difficult to implement desired restoring force.

Meanwhile, the optical pattern layers 123 and 124 may be formed to partially have elastic and adhesive properties.

Figure 4:
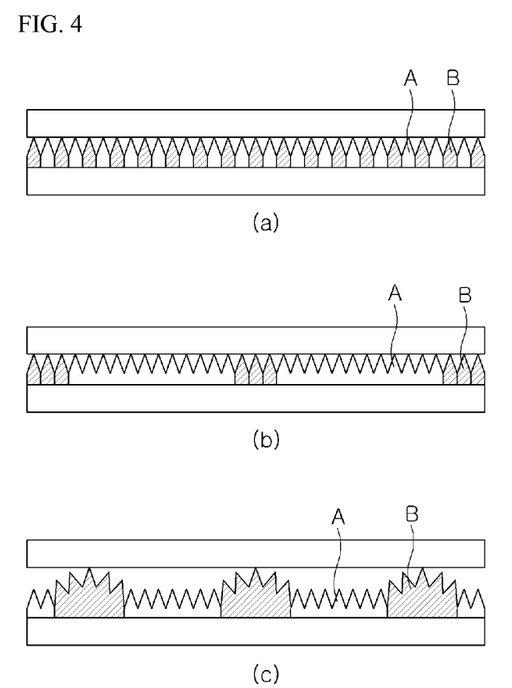
FIG. 4 is a cross-sectional view of a prism sheet according to another exemplary embodiment of the present invention.

FIG. 4 is a cross-sectional view of a prism sheet according to another exemplary embodiment of the present invention.

Referring to FIG. 4A, the optical pattern layer may be formed so that a layer A having adhesion and a layer B having adhesion and elasticity are alternately arranged. FIG. 4A illustrates that the layer A and the layer B are repeatedly arranged according to the shape of the optical pattern, but the layer A and the layer B are not limited thereto.

Referring to FIG. 4B, the optical pattern layer may be formed by the layer B having adhesion and elasticity only at an edge and a center which are easily damaged by external force. The edge of the optical pattern layer is a portion which easily receives the external force when the backlight unit is assembled, and the center thereof is a portion which easily receives the external force when the product, that is, the liquid crystal display is used. Accordingly, the adhesion and the elasticity are provided to the edge and the center of the optical pattern layer, and as a result, the damage due to the external force may be suppressed.

Referring to FIG. 4C, only a portion having a high step in the optical pattern layer, that is, a region adhering to the upper film may be formed by the layer B with the adhesion and the elasticity. The region adhering to the upper film is a portion which is directly influenced by the external force, and is provided with the elasticity and the adhesion, thereby minimizing the damage due to the external force.

Figure 5:
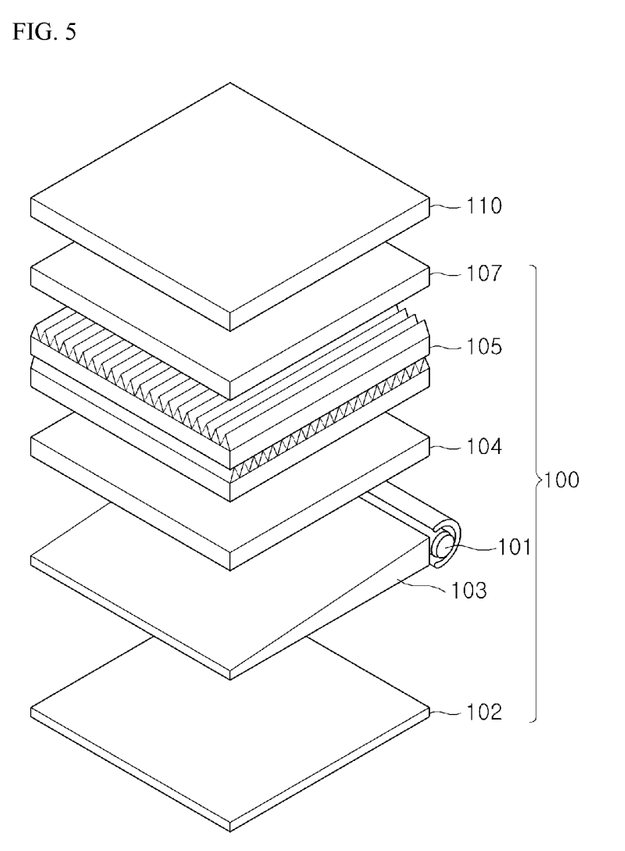
FIG. 5 is an exploded perspective view of a liquid crystal display according to the exemplary embodiment of the present invention.

FIG. 5 is an exploded perspective view of a liquid crystal display according to an exemplary embodiment of the present invention.

Referring to FIG. 5, the liquid crystal display includes a backlight unit 100 for supplying light, a liquid crystal panel 110 for receiving light from the backlight unit 100 and displaying an image, and a driving module (not illustrated) for driving the liquid crystal panel 110 and the backlight unit 100.

The liquid crystal panel 110 displays the image by using the light supplied from the backlight unit 100. Such a liquid crystal panel 110 includes a first substrate with a thin film transistor (hereinafter, TFT) arranged in a matrix form and a pixel electrode, a second substrate facing the first substrate and with an opposing electrode pattern, and a liquid crystal layer interposed between the two substrates.

The liquid crystal layer is constituted by molecules having optical anisotropy, and has a characteristic in which the arrangement of the molecules is changed depending on a direction of the electric field when a voltage is applied thereto, and as a result, polarization of light may be changed depending on whether the voltage is supplied or not. Polarizers are provided on upper and lower sides of the liquid crystal panel by using such a characteristic of the liquid crystal layer to transmit or block the light, thereby displaying an image.

The backlight unit 100 includes a light source 101 generating light, a light guide plate 103 shifting the light generated from the light source 101 to a surface light source, a reflection plate 102 reflecting the light emitted to the rear side of the light guide plate 103 to the inside of the light guide plate 103, and a plurality of optical sheets 104 and 105 and a protective sheet 107 disposed at the front side of the light guide plate 103.

The light source 101 is disposed at the rear side or the side of the light guide plate 103 and generates the light. As the light source 101, a cold cathode tube, a light emitting diode (LED), an organic light emitting diode (OLED), and the like may be used, and recently, the OLED and the LED having low power consumption have been mainly used.

The light guide plate 103 is disposed at the rear side of the liquid crystal panel 110 and shifts the light generated from the light source 101 to the surface light source to emit the shifted light to the liquid crystal panel 110 side. The light guide plate 103 may be made of a plastic-based transparent material such as acryl.

The reflection plate 102 is disposed at the rear side of the light guide plate 103 and reflects the light emitted to the rear side of the light guide plate 103 to input the reflected light to the light guide plate 103. The loss of light is minimized by using such a reflection plate 102 to prevent the deterioration of the luminance, thereby suppressing power consumption from being unnecessarily increased.

The optical sheets 104 and 105 include a diffusion sheet 104 diffusing the light incident from the light guide plate 103 to the liquid crystal panel 110 side and a prism sheet 105 disposed at the front side of the diffusion sheet 104 and concentrating the light diffused by the diffusion sheet 104 and emitting the concentrated light to the liquid crystal panel 110 side. The prism sheet 105 is formed with the optical pattern layer on which the optical pattern for concentrating the light is formed on the entire surface thereof.

Here, in the exemplary embodiment of the present invention, when the prism sheet 105 is configured, a plurality of prism sheets 105 is used so as to efficiently concentrate the diffused light to emit the concentrated light to the liquid crystal panel 110 side in a substantially vertical direction. Further, the plurality of prism sheets 105 is integrally formed by adhering to each other to easily assemble the backlight unit and suppress the prime sheets from being misaligned during the use of the product. Particularly, the optical pattern layer is easily restored to the original state when the optical pattern layer is deformed by the external force, by providing elasticity to the optical pattern layer of the prism sheet 105 disposed at the lower side.

The protective sheet 107 is disposed at the front side of the prism sheet 105 to prevent the damage to the prism sheet 105 due to the contact with the liquid crystal panel 110, and is not an essential constituent element.

Figure 6:
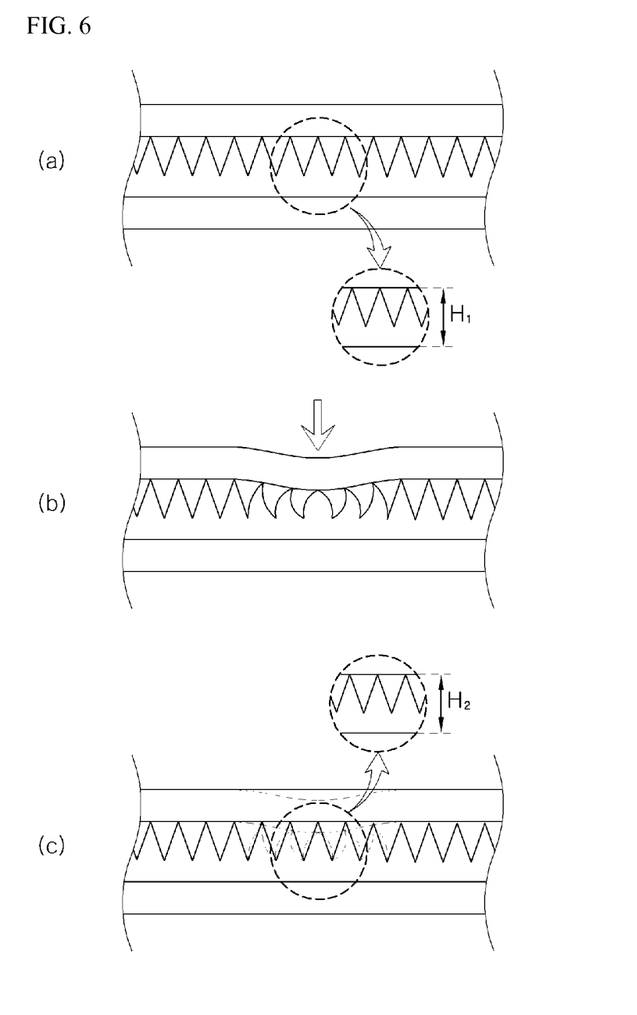
FIG. 6 is a cross-sectional view illustrating a deformed state of the prism sheet according to the exemplary embodiment of the present invention.
Figure 7:
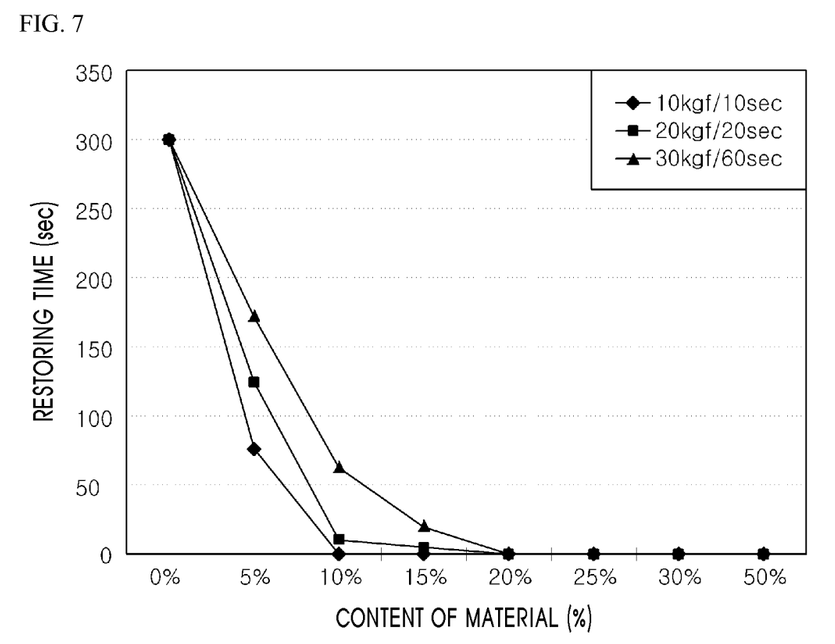
FIG. 7 is a graph illustrating an experimental result of the degree of restoration of the prism sheet according to the exemplary embodiment of the present invention.

FIG. 6 is a cross-sectional view illustrating a deformed state of the prism sheet according to the exemplary embodiment of the present invention, and FIG. 7 is a graph illustrating an experimental result of the degree of restoration of the prism sheet according to the exemplary embodiment of the present invention.

In order to evaluate restoration performance of the prism sheet according to the exemplary embodiment of the present invention, the prism sheet formed in the exemplary embodiment is formed by varying the contents of the main material and the elastic material, and the degree of restoration of the prism sheet was experimented by using the liquid crystal display formed by applying the prism sheet.

The prism sheet used a mixed material, which is obtained by mixing the elastic material with the main material by increasing by 5% with respect to the weights of the main material and the elastic material, and the prism sheet was formed by forming the optical pattern layer on the base substrate and then procuring the formed optical pattern layer at 0.2 J/cm$^2$, and attaching the upper film on the optical pattern layer and then post-curing the attached upper film at 0.3 J/cm$^2$.

The restoring force experiment was performed at a temperature of 20° C. and performed so as to pressurize the center of the liquid crystal display by descending a metallic push head at a velocity of 5 m/min and then release the pressure when a predetermined time has elapsed, after fixing the liquid crystal display onto a rigid flat holder. In this case, times, when the center of the liquid crystal display was pressurized by a weight of 10 kgf for 10 seconds, a weight of 20 kgf for 20 seconds, and a weight of 30 kgf for 60 seconds and then the pressure was released, and the pressurized portion was restored to the original state, were measured.

FIG. 6 illustrates a deformed state of the prism sheet due to the external force. When the external force is applied to the prism sheet, the optical pattern layer is deformed in a shape illustrated in FIG. 6B. The optical pattern layer keeps the adhering state with the upper film and is deformed to a state in which the appearance thereof is bent or pressed. Then, when the external force is removed and a predetermined time elapses, the optical pattern layer is restored to the original state as illustrated in FIG. 6C. In this case, it is ideal that the optical pattern layer is restored equally 100% to the original state, but there may be a case where the restored degree does not reach 100% due to an ambient environment and the like (H1≥H2). Accordingly, in the experiment, when a height H2 of the restored optical pattern layer reaches at least 95% of a height H1 of the optical pattern layer before deformation, it is defined that the optical pattern layer is restored to the original state, and as a result, the restoring time was measured.

Adhesion of the optical pattern layer was measured. The adhesion of the optical pattern layer means force applied when the upper film is released from the optical pattern layer.

The following Table 1 shows a result of measuring a time taken for the prism sheet to be restored to the original state and adhesion of the optical pattern layer according to the contents of the main material A and the elastic material B. In addition, FIG. 7 is a graph illustrating a result of measuring restoring times of the prism sheet in Table 1.

TABLE 1

|  | A (wt %) | B (wt %) | 10 kgf/10 s (seconds) | 20 kgf/20 s (seconds) | 30 kgf/30 s (seconds) | Adhesion (g) |
|---|---|---|---|---|---|---|
| Comparative Example 1 | 100 | 0 | 300 | 300 | 300 | 420 |
| Example 1 | 95 | 5 | 80 | 130 | 180 | 124 |
| Example 2 | 90 | 10 | 0 | 10 | 60 | 90 |
| Example 3 | 85 | 15 | 0 | 5 | 20 | 75 |
| Example 4 | 80 | 20 | 0 | 0 | 0 | 63 |
| Example 5 | 75 | 25 | 0 | 0 | 0 | 55 |
| Example 6 | 70 | 30 | 0 | 0 | 0 | 47 |
| Example 7 | 50 | 50 | 0 | 0 | 0 | 40 |

Referring to Table 1 and FIG. 7, in the case of a Comparative Example in which the elastic material is not used at all when the prism sheet is formed, a time taken for the prism sheet to be restored to the original state was measured as 300 seconds. On the other hand, in the case of Examples 1 to 7 in which the elastic materials are used, it can be seen that times taken for the prism sheet to be restored to the original state were significantly shortened as compared with the Comparative Example. In addition, as the content of the elastic material is increased, the restoring time is rapidly shortened, and particularly, in the case where 10% or more of the elastic material is used, when the prism sheet is pressurized at a weight of 10 kgf for 10 seconds and then the pressure is released, it can be seen that the prism sheet is restored at the same time when the pressure is released. In addition, in the case where 20% or more of the elastic material is used, it can be seen that the restoring time is measured as 0 for each pressurizing degree and the restoration is performed at the same time when the pressure is released. By such an experimental result, the prism sheet, that is, the optical pattern layer may have a restoring time within at least 60 seconds from the viewpoint of suppressing the deformation due to the use of the liquid crystal display and improving productivity.

As such, as the content of the elastic material is increased, the restoring time of the prism sheet, that is, the restoring force may be improved, but in the case where the content of the elastic material is too much, the restoring force is little improved, and the hardness of the prism sheet deteriorates so that the prism sheet is easily deformed even by relative small force, and thus the luminance may deteriorate. Further, there is a problem in that the adhesion of the main material for forming the prism sheet deteriorates, and thus the upper film attached onto the optical pattern layer is easily released. In Table 1, when reviewing a change in adhesion of the optical pattern layer according to the content of the elastic material, it can be seen that the adhesion of the optical pattern layer deteriorates as the content of the elastic material is increased. However, since the protective sheet, the liquid crystal panel, and the like are disposed on the prism sheet, the optical pattern layer may have adhesion enough to maintain the adhesion state with the upper film, and may have adhesion of at least 10 g or more and more preferably 40 g.

Accordingly, the prism sheet according to the exemplary embodiment of the present invention may use the main material and the elastic material in a range of 10% to 50% with respect to a total weight of the main material and the elastic material.

As such, detailed exemplary embodiments are described in the detailed description of the present invention, but the present invention may be variously modified within the scope without departing from the category of the present invention. Therefore, the scope of the present invention should not be limited to the described exemplary embodiments, and should be determined by the scope of the claims to be described below and the equivalent thereto.

What is claimed is:

1. An optical member, comprising:
   a base film;
   an optical pattern layer provided on the base film and having an adhesive property; and
   an upper film partially adhering onto the optical pattern layer,
   wherein at least a partial region of the optical pattern layer is resiliently deformable,
   wherein at least a partial region of the optical pattern layer consists of a mixture comprising a main material and an elastic material,
   wherein the main material includes at least one of an acrylated monomer, a diacrylated monomer, a urethane acrylate oligomer, a polyester acrylate oligomer, an epoxy acrylated oligomer, and a high refractive acrylated monomer,
   wherein the elastic material includes at least one (meth) acrylate compound selected from a compound group represented by the following Chemical Formulas 1 to 3:

[Chemical Formula 1]

[Chemical Formula 2]

[Chemical Formula 3]

where, in the Chemical Formulas 1 to 3, X is any one of S, C(CH3)2, PO2, and SO2, Y is H or CH3, and Z is H or CH3, and n+m has values of 5 to 30.

2. The optical member of claim 1, wherein a composition ratio of the elastic material with respect to the mixture ranges from 10 to 50% by weight.

3. The optical member of claim 1, wherein the optical pattern layer includes optical patterns having of a same height.

4. The optical member of claim 1, wherein the optical pattern layer includes optical patterns having a multiple structure with steps having different heights.

5. The optical member of claim 1, wherein the optical pattern layer is restored within 60 seconds when the optical pattern layer is pressurized at a weight of 10 kgf to 30 kgf for 10 seconds to 60 seconds.

6. The optical member of claim 1, wherein when the external force is removed, the optical pattern layer is restored to 95% or higher of a state before the external force is applied.

7. A light source device including the optical member of claim 1.

8. A light source device including the optical member of claim 2.

9. A light source device including the optical member of claim 3.

10. A light source device including the optical member of claim 4.

11. A light source device including the optical member of claim 5.

12. A light source device including the optical member of claim 6.

13. A display device including the light source device of claim 7.

14. The display device of claim 13, further comprising a protective film.

* * * * *

UNITED STATES PATENT AND TRADEMARK OFFICE
CERTIFICATE OF CORRECTION

PATENT NO. : 9,448,342 B2  
APPLICATION NO. : 14/391391  
DATED : September 20, 2016  
INVENTOR(S) : Jee Hong Min et al.

Page 1 of 1

It is certified that error appears in the above-identified patent and that said Letters Patent is hereby corrected as shown below:

On the title page

"Foreign Application Priority Data" item 30, change July 09, 2012 to April 09, 2012.

Signed and Sealed this  
Twentieth Day of December, 2016

Michelle K. Lee  
*Director of the United States Patent and Trademark Office*